OR 3,744,880

United States ×4/25T
Yuta

[11] 3,744,880
[45] July 10, 1973

[54] PRECISION COPYING LENS
[76] Inventor: Koichi Yuta, No. 3-27-41, Hujoshicho, Kokubunji-shi, Tokyo, Japan
[22] Filed: Feb. 10, 1972
[21] Appl. No.: 225,247

[52] U.S. Cl.................. 350/214, 350/177, 350/234
[51] Int. Cl. .............................................. G02b 9/64
[58] Field of Search..................... 350/177, 214, 215

[56] References Cited
UNITED STATES PATENTS
3,450,463   6/1969   Yasuda .......................... 350/215 X
3,572,902   3/1971   Uetake........................... 350/214 X
3,664,728   5/1972   Yuta ................................... 350/214

*Primary Examiner*—John K. Corbin
*Attorney*—Kurt Kelman

[57] ABSTRACT

The precision copying lens comprises a first to a seventh lens component beginning at the object side, the first and the second lens component forming the first part of the lens and the third and the fourth lens component forming the second part spaced a distance from the first part, while the fifth to the seventh lens component form the third part spaced a distance from the second part. The first lens component consists of three lens elements cemented to each other and the second lens component is in the form of meniscus arranged closely adjacent to the first lens component. At least one of the third and the fourth lens component consists of two lens elements cemented to each other. Each of the fifth and the sixth lens components consists of two lens elements cemented to each other, while the seventh lens component is in the form of a meniscus having a large width. The copying lens satisfies the following conditions:

$$0.8f < |r_3| < 1.2f$$
$$0.6f < r_{15} < 0.8f$$
$$1.0f < |r_{13}| < 1.5f$$
$$25 < |v_{14} - v_{13}|$$

where:
$f$ = focal length of the entire system,
$r_3$ = radius of curvature of the cemented surfaces at the image side in the first lens component,
$r_{15}$ = radius of curvature of the air interface of the sixth lens component at the object side,
$r_{13}$ = radius of curvature of the cemented surfaces in the fifth lens component,
$v_{13}$ = Abbe number of the lens element at the object side in the fifth lens component, and
$v_{14}$ = Abbe number of the lens element at the image side in the fifth lens component.

5 Claims, 17 Drawing Figures

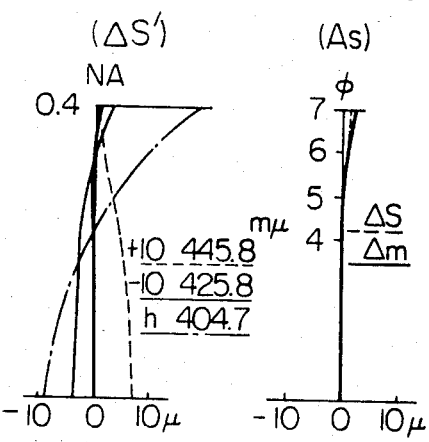
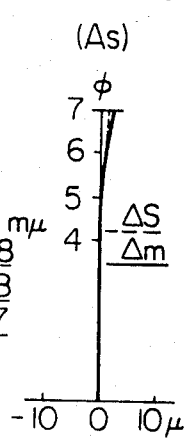
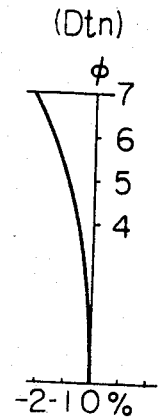
FIG. 3A (ΔS')  FIG. 3B (As)  FIG. 3C (Dtn)
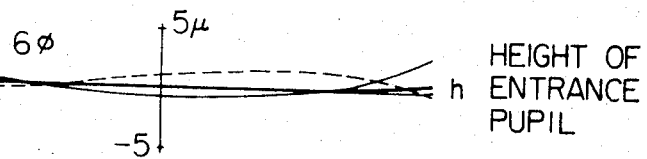
FIG. 4A
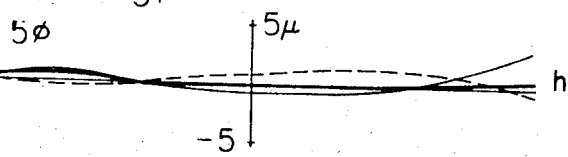
FIG. 4B
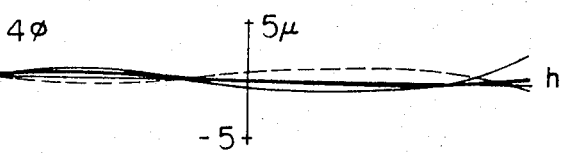
FIG. 4C
FIG. 4D  CENTER

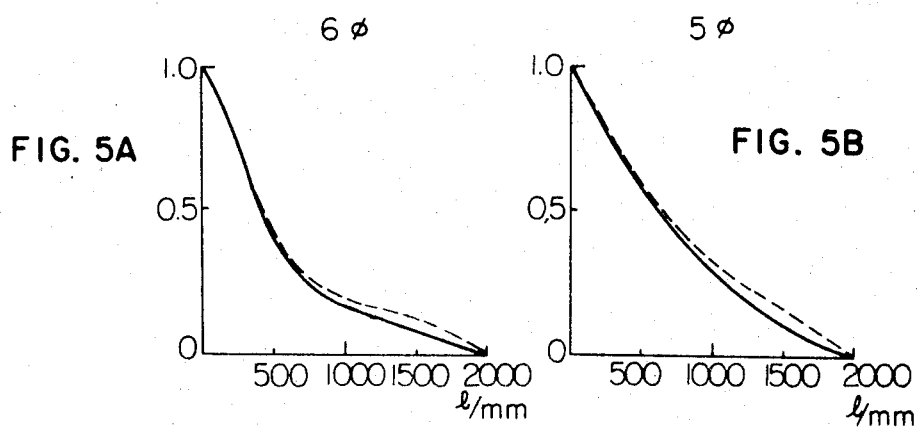
FIG. 5A  6∅
FIG. 5B  5∅
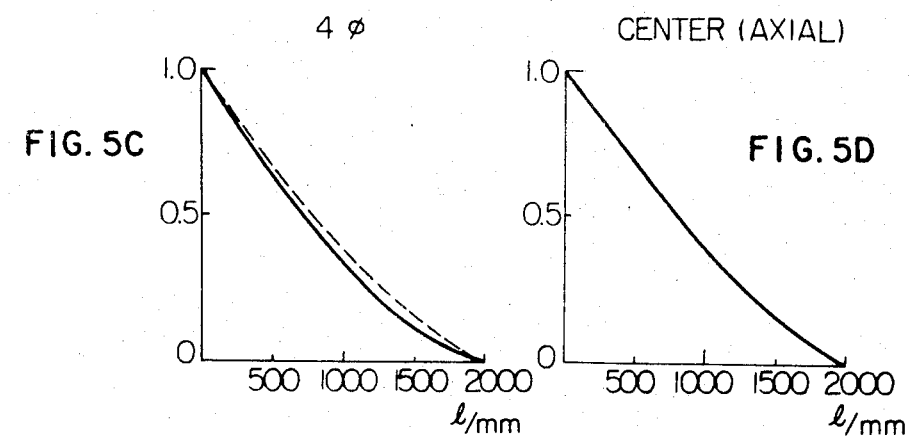
FIG. 5C  4∅
FIG. 5D  CENTER (AXIAL)

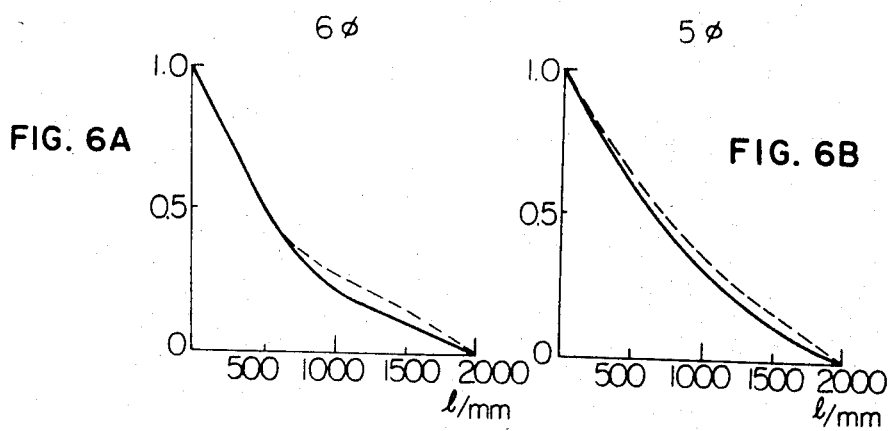
FIG. 6A  6φ
FIG. 6B  5φ
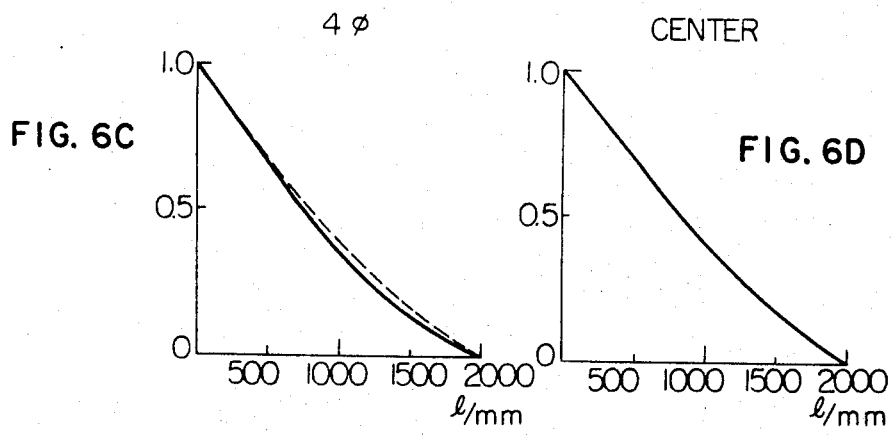
FIG. 6C  4φ
FIG. 6D  CENTER

PRECISION COPYING LENS

BACKGROUND OF THE INVENTION

The present invention relates to a precision copying or reproducing lens and, more particularly, to a precision copying lens adapted to be used in projecting an image of very fine patterns onto the surface of an electronic circuit such as an integrated circuit when the electronic circuit is to be produced.

Such a copying lens is required to have a very high resolving power capable of obtaining a very sharp image of an object in the light of the purpose for which the copying lens is utilized.

The present applicant has previously proposed a precision copying lens consisting of seven lens groups forming three parts of the copying lens.

In the precision copying lens previously proposed by the present applicant, it consists of a first, a second and a third part arranged in order beginning at the object side with an air gap existing between the adjacent parts, the first part consisting of a first and a second lens component arranged closely adjacent to the first lens component, the second part consisting of a third and a fourth lens component arranged closely adjacent to the third lens component, while the third part consists of a fifth, a sixth and a seventh lens component arranged closely adjacent to each other. The first lens component consists of three lens elements cemented with each other, the intermediate lens element being of a convex lens element, and at least one of the third and the fourth lens components has two lens elements cemented to each other, the sixth lens component consisting of two lens elements cemented to each other, while the sixth lens component is of a concave meniscus having a large thickness. Further, certain limiting conditions are given to the radius of curvature of the cemented surface in the first lens component, the radius of curvature of the convex surface in the sixth lens component, the air gap between the second part and the third part, and the focal length each of the first part and the second part so as to provide a very high resolving power over the entire range of the field. The high performance of the copying lens has been proved by the actual test thereof.

However, it is required to utilize fairly high quality monochromatic light rays in order to sufficiently exhibit such a high performance by using the copying lens described above. In other words, although the above described copying lens was originally designed to utilize intense monochromatic light rays obtained by ultra-high pressure mercury vapor lamp, the chromatic aberrations were compensated for fairly well so that a particularly high performance was obtained in comparison with other existing copying lenses. However, in order to exhibit a further high performance expected from the viewpoint in design, the compensation for the chromatic aberration was rather insufficient. Therefore, it was necessary to use a high quality non-metallic multi-layer interference filter so as to improve the quality of the monochromatic property of the light rays. It is, however, considerably difficult to produce such a multi-layer interference filter requiring a long time and a high cost in the production thereof, and, further, the transmittivity of the illuminating light rays is not so high.

In order to avoid the above described disadvantages, it has been desired to further improve the compensation for the chromatic aberration of the copying lens and to permit the copying lens to be used with a filter having a conventional performance and a high transmittivity thereby lowering the manufacturing cost while the high performance is retained. The present invention has been developed from the viewpoint as described above and has succeeded to provide a precision copying lens having a superior performance avoiding the above described disadvantages.

SUMMARY OF THE INVENTION

The present invention aims at widely improving the performance of the copying lens described above.

Therefore, it is the object of the present invention to provide an improved precision copying lens which has a superior performance capable of effective use for the purpose described above.

The above object is achieved in accordance with the present invention by providing a precision copying lens having a first, a second and a third part arranged in order and spaced a distance from each other with the first part located at the object side, the first part having a first lens component consisting of three lens elements cemented to each other and a second lens component in the form of a meniscus located closely adjacent to the first lens component, the second part having a third and a fourth lens component, at least one of the third and fourth lens components consisting of two lens elements cemented to each other, the third part having a fifth, a sixth and a seventh lens component, each of the fifth and sixth lens components consisting of two lens elements cemented to each other while the seventh lens component is in the form of a meniscus having a large thickness and is arranged closely adjacent to the sixth lens component, the copying lens being characterized in that it satisfies the following conditions:

$$0.8 < |r_3| < 1.2f$$
$$0.6f < r_{15} < 0.8f$$
$$1.0f < |r_{13}| < 1.5f$$
$$25 < |\nu_{14} - \nu_{13}|$$

where:

$r_3$ = radius of curvature of the cemented surfaces in the first lens component at the image side, $r_{15}$ = radius of curvature of the air interface of the sixth lens component at the object side, $\nu_{13}$ = Abbe number of the lens element in the fifth lens component at the object side, $\nu_{14}$ = Abbe number of the lens element in the fifth lens component at the image side, $r_{13}$ = radius of curvature of the cemented surfaces in the fifth lens component, $f$ = focal length of the entire system.

In other words, assuming that the radius of curvature of the respective surfaces each of the lens elements is indicated by $r$, the thickness each of the lens elements as well as the air gap between the adjacent lens elements is indicated by $d$, and the refractive index and the Abbe number each of the lens elements are indicated by $n$ and $\nu$, respectively, and the order of the arrangement each of the above described reference letters beginning at the object side is given by the suffix 1, 2, - - - added to the above letters, then the Abbe numbers $\nu_{13}$ and $\nu_{14}$ of the respective lens elements in the fifth lens component having the cemented surfaces $r_{13}$ are selected to be proper values as defined in the above conditions, and, in order to sufficiently completely compensate for the aberrations other than the chromatic aberration, proper conditions are given to the radius of curvature $r_3$ of the cemented surfaces at the image side in the first lens component and the radius of curvature $r_{15}$ of the convex air interface of the sixth lens component as described above, thereby permitting the superior performance of the copying lens of the present invention to be obtained.

The reason for giving the above described conditions in accordance with the present invention will be described below.

The condition for the value $r_3$ is for maintaining a high quality of the image in the marginal zone thereof by suppressing the astigmatism as well as the coma caused by the non-axial oblique light rays. Insofar as the value $r_3$ is selected to be within the range limited by the upper and the lower limit as described above, the balance of the non-axial aberrations can be easily obtained thereby permitting the compensation for the various aberrations to be made easy. To the contrary, if the value $r_3$ exceeds beyond the upper limit, an insufficient compensation effect will result, while, when the value $r_3$ is made less than the lower limit, an excessive compensation effect tends to occur thereby resulting in the deterioration in the quality of the image in the marginal zone thereof so that it is made difficult to obtain a balance of the compensation effect for the various aberrations.

The conditions for the value $r_{15}$ is mainly for maintaining a high quality of the image at the central zone thereof. Insofar as the value $r_{15}$ is kept within the range defined by the upper and the lower limit, it is especially made easy to sufficiently compensate for the axial spherical aberration thereby permitting the resolving power at the central zone of the image to be made extremely high. To the contrary, if the value $r_{15}$ exceeds beyond the upper limit, an insufficient compensation effect for the spherical aberration tends to occur thereby making it impossible to obtain a large numerical aperture of the copying lens while it is made difficult to obtain a high resolving power at the central zone of the image. On the other hand, if the value $r_{15}$ is made less than the lower limit, the axial spherical aberration is deteriorated while a remarkably heavy curvature of field will take place thereby making it difficult to achieve compensation effect for the aberrations for obtaining a high quality of the image in the marginal zone thereof.

The condition for the value $r_{13}$ and the condition for the difference between the values $n_{13}$ and $n_{14}$ as well as the condition for the difference between the values $\nu_{13}$ and $\nu_{14}$ have mutual relationships. It has been found in the advance in design for improving the chromatic aberration in the present invention that it is necessary to effect an intense compensation for the chromatic aberration not only by the sixth lens component in the third part but also by the fifth lens component in the third part. Thus, in accordance with the present invention, the sixth lens component is made to include two lens elements cemented to each other and an effective compensation is achieved by the lens elements located at the front and the rear side of the cemented surfaces in the sixth lens component by setting appropriate conditions given thereto. In order to achieve an intense compensation effect for the chromatic aberration, the difference between the Abbe numbers of the lens elements at the front and the rear side of the above described cemented surfaces is selected to be as large as possible while the curvature of the above described cemented surfaces is selected to be as great as possible. This is the reason why the lower limit is set with respect to the difference between the values $\nu_{13}$ and $\nu_{14}$. Unless a difference in the order of the lower limit described above is given between the values $\nu_{13}$ and $\nu_{14}$, it is difficult to obtain a sufficient compensation effect for the chromatic aberration. It is the same with the upper limit of the value $|r_{13}|$. In order to obtain an effective compensation effect for the chromatic aberration by increasing the absolute value of the curvature of the cemented surfaces in the fifth lens component, the absolute value of the radius of curvature $|r_{13}|$ must be kept lower than a certain value as defined in the condition described above. Otherwise, an effective compensation effect cannot be expected. To the contrary, if the absolute value $|r_{13}|$ is made lower than the lower limit to make the curvature too great, it is made difficult to obtain an appropriate balance of the aberrations other than the chromatic aberration. In other words, it is in fact desirable to increase the difference between the Abbe numbers referred to above. In the actual case, however, a material having a low value of the Abbe number $\nu$ tends to remarkably absorb the light having shorter wave lengths. Therefore, in order to most effectively transmit the light through a lens element, it is not preferred to use the lens element made of the material having a low Abbe number. Thus, the materials having certain limits in the Abbe numbers must be used in combination in constructing the fifth lens component, so that it is made difficult to obtain a remarkably great difference between the Abbe numbers. This is the reason why the curvature of the cemented surfaces in the fifth lens component is selected to be great, so that the compensating effect for the chromatic aberration is augmented by virtue of the great curvature of the cemented surfaces in the fifth lens component.

BRIEF DESCRIPTION OF THE DRAWINGS

FIGS. 3(A) to (C) and 4(A) to (D) are diagrams showing the various aberrations of the first embodiment of FIG. 1 in the sense of the geometrical optics, FIG. 3(A) showing the longitudinal axial spherical aberration and the chromatic aberration, FIG. 3(B) showing the non-axial astigmatism, FIG. 3(C) showing the non-axial distortion, while FIG. 4(A) to (D) show the lateral spherical aberration, the chromatic aberration as well as the coma in accordance with the various image heights, respectively;

FIGS. 5(A) to (D) show various optical transfer functions (OTF) relating to the first embodiment of FIG. 1 in the sense of the physical optics with the diffraction being taken into consideration, the respective diagrams being obtained in accordance with the various image heights; and FIG. 6(A) to (D) are diagrams similar to FIG. 5(A) to (D) but showing the various optical transfer functions relating to the second embodiment of FIG. 2.

DETAILED DESCRIPTION OF THE PREFERRED EMBODIMENTS

Figure 1:
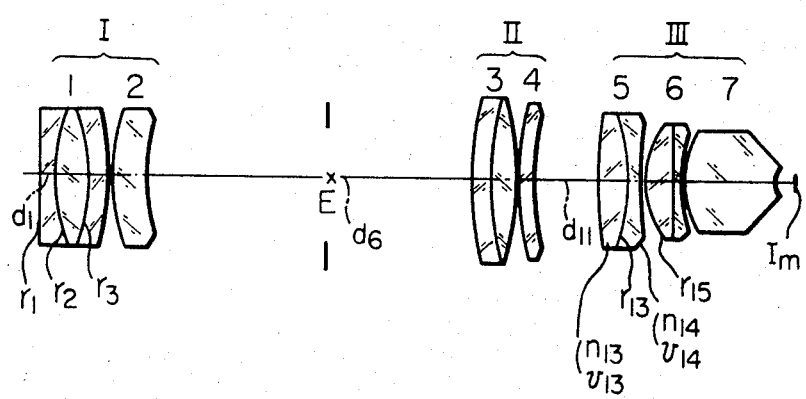
FIG. 1 is a longitudinal sectional view showing the first embodiment of the precision copying lens of the present invention.
Figure 2:
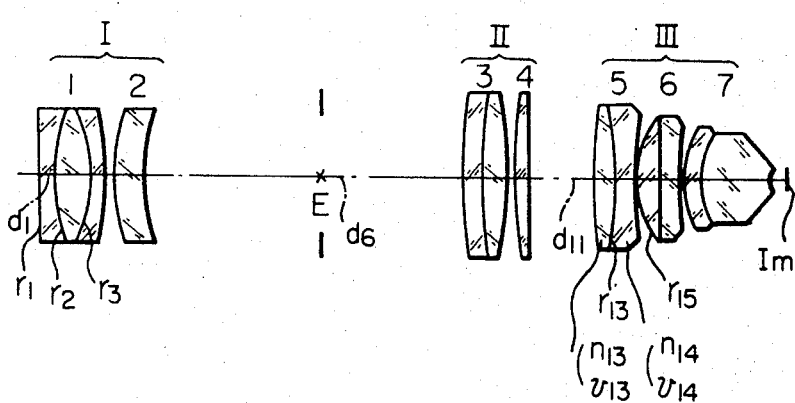
FIG. 2 is a view similar to FIG. 1 but showing the second embodiment of the present invention.

Referring now to FIGS. 1 and 2 showing the first and the second embodiment of the present invention, respectively, these embodiments comprises seven lens components forming three parts of the copying lens. The second embodiment is substantially similar to the first embodiment except that the seventh lens component at the image side consists of two lens elements cemented to each other so as to increase the freedom in achieving the compensation effect.

As shown in FIG. 1, the first embodiment comprises first to seventh lens components arranged in order beginning at the object side. The first and the second lens component form the first part of the copying lens and the first lens component consists of three lens elements cemented to each other with the intermediate lens element being in the form of a convex lens, while the second lens component is in the form of a meniscus and located closely adjacent to the first lens component.

The third and the fourth lens components form the second part of the copying lens spaced a distance from the first part, and the fourth lens component is located closely adjacent to the third lens component, at least one of the third and the fourth lens components consisting of two lens elements cemented to each other.

The fifth to the seventh lens components form the third part of the copying lens spaced a distance from the second part and each of the fifth and the sixth lens components of two lens elements cemented to each other, while the seventh lens component is in the form of a meniscus having a large thickness and is arranged closely adjacent to the sixth lens component, the sixth lens component being located closely adjacent to the fifth lens group.

It is assumed that the standard or reference light is selected to be mercury $g$-line having the wave length of 435.8 m$\mu$ and the embodiment is calculated as having the focal length $f$ of 50mm. The value of Abbe number $\nu$ is given by the value of $\nu_g$ as defined in the following equation:

$$\nu_g = n_g - 1/n_k - n_F$$

where:
$n_g$ = refractive index with respect to the light of mercury $g$-line having the wave length of 435.8 m$\mu$,
$n_k$ = refractive index with respect to the light of $g$-line having the wave length of 404.7 m$\mu$, and
$n_F$ = refractive index with respect to the light of F-line having the wave length of 486.1 m$\mu$.

The numerical data of an example of the first embodiment of the present invention are given in Table I.

TABLE I ($f = 50$)
($S' = 4.7$)

| k | $r_k$ | $d_k$ | $n_k$ | $\nu_k$ |
|---|-------|-------|-------|---------|
| 1 | 862.80 | 5.5 | 1. | |
| 2 | 57.874 | 14.0 | 1.57976 | 66.41 |
| 3 | −48.839 | 5.6 | 1.52163 | 62.17 |
| 4 | −169.57 | 1.2 | 1.72934 | 55.72 |
| 5 | 96.448 | 12.3 | 1. | |
| 6 | 102.56 | 129.1 | 1.65306 | 62.85 |
| 7 | 239.36 | 6.2 | 1. | |
| 8 | 93.737 | 9.3 | 1.67248 | 31.98 |
| 9 | −182.34 | 0.6 | 1.58504 | 51.14 |
| 10 | 134.08 | 7.4 | 1. | |
| 11 | 267.36 | 23.0 | 1.68446 | 59.16 |
| 12 | 456.70 | 9.0 | 1. | |
| 13 | −58.573 | 5.5 | 1.65306 | 62.85 |
| 14 | 1940.0 | 0.3 | 1.67248 | 31.98 |
| 15 | 34.566 | 9.9 | 1. | |
| 16 | 602.30 | 4.9 | 1.49593 | 75.03 |
| 17 | 84.028 | 0.6 | 1.67248 | 31.98 |
| 18 | 32.992 | 33.2 | 1. | |
| 19 | 15.718 | | 1.52163 | 62.17 |
| | | | 1. | | where:
$f$ = focal length of the lens,
$S'$ = working distance at the image side,
$k = 1, 2, \cdots 19$ indicating the location in order beginning at the object side,
$r_k$ = radius of curvature of the respective surfaces each of the lens elements,
$d_k$ = thickness each of the lens elements and the distance between the adjacent lens elements,
$n_k$ = refractive index each of the lens elements and air, and
$\nu_k$ = Abbe number each of the lens elements.

The numerical data of the two examples of the second embodiment of the present invention are given in the following Tables II and III, respectively.

TABLE II ($f = 50$)
($S' = 5.35$)

| k | $r_k$ | $d_k$ | $n_k$ | $\nu_k$ |
|---|-------|-------|-------|---------|
| 1 | 917.85 | 5.53 | 1. | |
| 2 | 53.670 | 12.30 | 1.65306 | 62.85 |
| 3 | −42.998 | 5.53 | 1.51991 | 66.83 |
| 4 | −181.20 | 1.23 | 1.65306 | 62.85 |
| 5 | 72.234 | 12.30 | 1. | |
| 6 | 74.345 | 129.11 | 1.63634 | 58.65 |
| 7 | 445.87 | 6.15 | 1. | |
| 8 | 122.14 | 9.34 | 1.68446 | 59.16 |
| 9 | −178.97 | 0.61 | 1.58142 | 57.57 |
| 10 | 107.16 | 7.38 | 1. | |
| 11 | 607.00 | 22.94 | 1.68446 | 59.16 |
| 12 | 220.07 | 9.00 | 1. | |
| 13 | −69.501 | 5.50 | 1.65306 | 62.85 |
| 14 | 287.18 | 0.30 | 1.67248 | 31.98 |
| 15 | 35.052 | 9.84 | 1. | |
| 16 | 226.41 | 4.92 | 1.49593 | 75.03 |
| 17 | 77.894 | 0.61 | 1.67248 | 31.98 |
| 18 | 35.996 | 6.00 | 1. | |
| 19 | 21.419 | 27.20 | 1.67248 | 31.98 |
| 20 | 17.471 | | 1.49593 | 75.03 |
| | | | 1. | | where $f$ = focal length of the lens,
$S'$ = working distance at the image side,
$k = 1, 2, \cdots 20$ indicating the location in order beginning at the object side,
$r_k$ = radius of curvature of the respective surfaces each of the lens elements,
$d_k$ = thickness each of the lens elements and the distance between the adjacent lens elements,
$n_k$ = refractive index each of the lens elements and air, and
$\nu_k$ = Abbe number each of the lens elements.

Table III ($f = 50$)
($S' = 5.3$)

| k | $r_k$ | $d_k$ | $n_k$ | $\nu_k$ |
|---|-------|-------|-------|---------|
| 1 | 863.43 | 5.5 | 1. | |
| 2 | 53.592 | 14.0 | 1.65290 | 56.43 |
| 3 | −43.517 | 5.5 | 1.51991 | 66.83 |
| 4 | −179.56 | 1.2 | 1.65306 | 62.85 |
| 5 | 72.332 | 12.3 | 1. | |
| 6 | 73.163 | 129.1 | 1.65306 | 62.85 |
| 7 | 397.6 | 6.2 | 1. | |
| 8 | 144.40 | 9.3 | 1.68446 | 59.16 |
| 9 | −178.47 | 0.6 | 1.57526 | 63.42 |
| 10 | 110.12 | 7.4 | 1. | |

| | | | | |
|---|---|---|---|---|
| 11 | 590.44 | 22.9 | 1.68446 | 59.16 |
| 12 | 227.03 | 9.0 | 1. | |
| 13 | −68.407 | 5.5 | 1.65306 | 62.85 |
| 14 | 289.29 | 0.3 | 1.67248 | 31.98 |
| 15 | 35.083 | 9.9 | 1. | |
| 16 | 240.01 | 4.9 | 1.49593 | 75.03 |
| 17 | 78.151 | 0.6 | 1.67248 | 31.98 |
| 18 | 35.820 | 6.0 | 1. | |
| 19 | 21.462 | 27.2 | 1.67248 | 31.98 |
| 20 | 17.505 | | 1.49593 1. | 75.03 | where the reference letters used therein are the same as described with respect to Table II.

The following Tables IV to VI show the Seidel's coeffecients of the examples shown in Tables I to III, respectively, as indicated by Berek's representation in which tee focal length is set to $f=1$ as in the case of ordinary photographic lenses.

TABLE IV

| k | $A_k$ | $B_k$ | $\Gamma_k$ | $P_k$ | $\square_k$ |
|---|---|---|---|---|---|
| 1 | 0.001 | 0.073 | 0.010 | 0.017 | 0.622 |
| 2 | −0.029 | −0.035 | −0.032 | −0.016 | −0.057 |
| 3 | −0.074 | −0.006 | 0.021 | −0.064 | 0.021 |
| 4 | −0.000 | −0.007 | 0.001 | 0.099 | −0.531 |
| 5 | 0.058 | 0.298 | 0.132 | 0.163 | 1.045 |
| 6 | −0.037 | −0.274 | −0.101 | −0.154 | −1.163 |
| 7 | 0.012 | 0.397 | 0.070 | 0.067 | 2.628 |
| 8 | −0.016 | −0.267 | −0.065 | −0.014 | −1.143 |
| 9 | 0.050 | 0.132 | 0.081 | 0.081 | 0.345 |
| 10 | −0.001 | −0.068 | −0.009 | 0.121 | 0.372 |
| 11 | 0.003 | 0.025 | −0.009 | −0.060 | 0.093 |
| 12 | −0.010 | −0.001 | 0.003 | 0.034 | −0.012 |
| 13 | −0.018 | −0.198 | −0.061 | −0.004 | −0.659 |
| 14 | 0.024 | 0.021 | 0.022 | 0.008 | 0.012 |
| 15 | 0.032 | 0.910 | 0.171 | 0.383 | 6.858 |
| 16 | −0.045 | −0.338 | −0.123 | 0.004 | −0.915 |
| 17 | 0.027 | 0.001 | 0.005 | −0.191 | −0.040 |
| 18 | −0.007 | −0.733 | −0.071 | 0.415 | −3.261 |
| 19 | 0.028 | 0.074 | −0.046 | −0.872 | 1.281 |
| Σ | 0.000 | 0.002 | 0.000 | 0.001 | 5.494 |

TABLE V

| k | $A_k$ | $B_k$ | $\Gamma_k$ | $P_k$ | $\square_k$ |
|---|---|---|---|---|---|
| 1 | 0.001 | 0.077 | 0.011 | 0.017 | 0.658 |
| 2 | −0.089 | −0.093 | −0.091 | −0.039 | −0.135 |
| 3 | −0.068 | −0.003 | 0.015 | −0.049 | 0.012 |
| 4 | −0.000 | −0.029 | 0.003 | 0.087 | −0.539 |
| 5 | 0.146 | 0.468 | 0.261 | 0.215 | 1.225 |
| 6 | −0.103 | −0.469 | −0.220 | −0.209 | −1.446 |
| 7 | 0.009 | 0.316 | 0.056 | 0.036 | 1.996 |
| 8 | −0.020 | −0.294 | −0.078 | −0.012 | −1.154 |
| 9 | 0.038 | 0.075 | 0.053 | 0.082 | 0.220 |
| 10 | 0.016 | 0.354 | 0.077 | 0.151 | 2.317 |
| 11 | 0.036 | 0.025 | 0.030 | −0.026 | −0.000 |
| 12 | −0.010 | −0.006 | 0.008 | 0.071 | −0.052 |
| 13 | −0.024 | −0.212 | −0.072 | −0.004 | −0.636 |
| 14 | 0.023 | 0.003 | 0.008 | −0.056 | −0.019 |
| 15 | 0.010 | 0.239 | 0.049 | 0.378 | 3.019 |
| 16 | −0.046 | −0.253 | −0.108 | 0.012 | −0.563 |
| 17 | 0.046 | 0.013 | 0.025 | −0.206 | −0.105 |
| 18 | −0.001 | −0.590 | −0.030 | 0.446 | −2.841 |
| 19 | 0.007 | 0.311 | 0.049 | −0.131 | 1.132 |
| 20 | 0.031 | 0.072 | −0.047 | −0.759 | 1.047 |
| Σ | 0.001 | 0.004 | 0.001 | 0.004 | 4.133 |

TABLE VI

| k | $A_k$ | $B_k$ | $\Gamma_k$ | $P_k$ | $\square_k$ |
|---|---|---|---|---|---|
| 1 | 0.001 | 0.077 | 0.011 | 0.018 | 0.659 |
| 2 | −0.089 | −0.092 | −0.091 | −0.039 | −0.134 |
| 3 | −0.067 | −0.003 | 0.014 | −0.048 | 0.010 |
| 4 | −0.000 | −0.026 | 0.003 | 0.088 | −0.529 |
| 5 | 0.144 | 0.477 | 0.262 | 0.218 | 1.262 |
| 6 | −0.108 | −0.492 | −0.231 | −0.216 | −1.509 |
| 7 | −0.011 | 0.351 | 0.063 | 0.040 | 2.157 |
| 8 | −0.013 | −0.202 | −0.051 | −0.011 | −0.841 |
| 9 | 0.043 | 0.092 | 0.063 | 0.081 | 0.256 |
| 10 | 0.011 | 0.257 | 0.054 | 0.147 | 1.909 |
| 11 | 0.036 | 0.026 | 0.030 | −0.027 | −0.001 |
| 12 | −0.011 | −0.004 | 0.007 | 0.069 | −0.040 |
| 13 | −0.025 | −0.219 | −0.074 | −0.004 | −0.659 |
| 14 | 0.023 | 0.003 | 0.008 | −0.055 | −0.019 |
| 15 | 0.010 | 0.241 | 0.049 | 0.378 | 3.044 |
| 16 | −0.047 | −0.266 | −0.112 | 0.011 | −0.604 |
| 17 | 0.045 | 0.013 | 0.025 | −0.205 | −0.105 |
| 18 | −0.001 | −0.603 | −0.032 | 0.449 | −2.901 |
| 19 | 0.007 | 0.311 | 0.049 | −0.131 | 1.145 |
| 20 | 0.031 | 0.069 | −0.046 | −0.757 | 1.023 |
| Σ | 0.001 | 0.011 | 0.003 | 0.005 | 4.122 |

FIGS. 3A to 3C and 4A to 4D show the aberrations of the example shown in FIG. 1 in the sense of the genral geometrcial optics, where the focal length is set to $f=50$mm, the reduction ratio being set to 1/10X, while the numerical aperture is set to $NA=0.4$ at the image side (corresponding to relative aperture F/1.1), the diameter of the image being taken up to 6mm. FIG. 3(A) shows the longitudinal axial spherical aberration and the chromatic aberration, FIG. 3(B) showing the non-axial astigmatism, while FIG. 3(C) shows the distortion FIGS. 4(A) to (C) show the lateral aberrations with the diameter of the image being taken 6mm, 5mm and 4mm, respectively, while FIG. 4(D) shows the lateral aberration at the center of the image, the curves showing the lateral spherical aberration, the coma and the lateral chromatic aberration at the respective image point. In view of FIGS. 4A to 4D it is apparent that the chromatic aberration is sufficiently compensated for, thereby insuring a high performance of the copying lens of the present invention together with the high resolving power obtained by the present invention.

FIGS. 5A to 5D shows various curves representing the optical transfer functions (OTF) of the example shown in FIG. 1 at the respective image point. FIGS. 5(A) to (C) show the OTF with the diameter of the image being taken 6mm, 5mm and 4mm, respectively, while FIG. 5(D) shows the OTF at the center of the image.

In like manner, FIGS. 6A to 6D shows the OTF of the example shown in FIG. 2. FIGS. 6(A) to (D) correspond to FIGS. 5(A) to (D), respectively.

As seen from these figures, it is apparent that the precision copying lens of the present invention provides an extremely high optical performance adapted to be used most effectively in the precision copying or reproducing operation.

I claim:

1. In a precision copying lens having a first, a second and a third part arranged in order and spaced a distance from each other with said first part located at the object side, said first part having a first lens component consisting of three lens elements cemented to each other and a second lens component in the form of a meniscus located closely adjacent to said first lens component, said second part having a third and a fourth lens component at least one of said third and fourth lens components consisting of two lens elements cemented to each other, said third part having a fifth, a sixth and a seventh lens component, each of said fifth and sixth lens components consisting of two lens elements cemented to each other while said seventh lens component is in the form of a meniscus having a large thickness and is arranged closely adjacent to said sixth lens component, the improvement wherein said fifth lens component is a doublet and said copying lens satisfies the following conditions:

$$0.8f < |r_3| < 1.2f$$
$$0.6f < r_{15} < 0.8f$$
$$1.0f < |r_{13}| < 1.5f$$
$$25 < |v_{14} - v_{13}|$$

where:

$r_3$ = radius of curvature of the cemented surfaces in the first lens component at the image side, $r_{15}$ = radius of curvature of the air interface of the sixth lens component at the object side, $v_{13}$ = Abbe number of the lens element in the fifth lens component at the object side, $v_{14}$ = Abbe number of the lens element in the fifth component at the image side, $r_{13}$ = radius of curvature of the cemented surfaces in the fifth lens group, and $f$ = focal length of the entire system.

2. Precision copying lens according to claim 1, wherein said seventh lens component consists of two lens elements cemented to each other.

3. Precision copying lens according to claim 2 and satisfying the following numerical data:

($f = 50$)
($S' = 5.35$)

| k | $r_k$ | $d_k$ | $n_k$ | $v_k$ |
|---|-------|-------|-------|-------|
| 1 | 917.85 | 5.53 | 1. | |
| 2 | 53.670 | 12.30 | 1.65306 | 62.85 |
| 3 | −42.998 | 5.53 | 1.51991 | 66.83 |
| 4 | −181.20 | 1.23 | 1.65306 | 62.85 |
| 5 | 72.234 | 12.30 | 1. | |
| 6 | 74.345 | 129.11 | 1.63634 | 58.65 |
| 7 | 445.87 | 6.15 | 1. | |
| 8 | 122.14 | 9.34 | 1.68446 | 59.16 |
| 9 | −178.97 | 0.61 | 1.58142 | 57.57 |
| 10 | 107.16 | 7.38 | 1. | |
| 11 | 607.00 | 22.94 | 1.68446 | 59.16 |
| 12 | 220.07 | 9.00 | 1. | |
| 13 | −69.501 | 5.50 | 1.65306 | 62.85 |
| 14 | 287.18 | 0.30 | 1.67248 | 31.98 |
| 15 | 35.052 | 9.84 | 1. | |
| 16 | 226.41 | 4.92 | 1.49593 | 75.03 |
| 17 | 77.894 | 0.61 | 1.67248 | 31.98 |
| 18 | 35.996 | 6.00 | 1. | |
| 19 | 21.419 | 27.20 | 1.67248 | 31.98 |
| 20 | 17.471 | | 1.49593 | 75.03 | where:

$S'$ = working distance at the image side $K = 1, 2, \text{---} 20$ indicating the location in order beginning at the object side, $r_k$ = radius of curvature of the respective surfaces each of the lens elements, $d_k$ = thickness each of the lens elements and the distance between the adjacent lens elements, $n_k$ = refractive index each of the lens elements and air, and $v_k$ = Abbe number each of the lens elements.

4. Precision copying lens according to claim 2 and satisfying the following numberical data:

($f = 50$)
($S' = 5.3$)

| k | $r_k$ | $d_k$ | $n_k$ | $v_k$ |
|---|-------|-------|-------|-------|
| 1 | 863.43 | 5.5 | 1. | |
| 2 | 53.592 | 14.0 | 1.65290 | 56.43 |
| 3 | −43.517 | 5.5 | 1.51991 | 66.83 |
| 4 | −179.56 | 1.2 | 1.65306 | 62.85 |
| 5 | 72.332 | 12.3 | 1. | |
| 6 | 73.163 | 129.1 | 1.65306 | 62.85 |
| 7 | 397.6 | 6.2 | 1. | |
| 8 | 144.40 | 9.3 | 1.68446 | 59.16 |
| 9 | −178.47 | 0.6 | 1.57526 | 63.42 |
| 10 | 110.12 | 7.4 | 1. | — |
| 11 | 590.44 | 22.9 | 1.68446 | 59.16 |
| 12 | 227.03 | 9.0 | 1. | |
| 13 | −68.407 | 5.5 | 1.65306 | 62.85 |
| 14 | 289.29 | 0.3 | 1.67248 | 31.98 |
| 15 | 35.083 | 9.9 | 1. | |
| 16 | 240.01 | 4.9 | 1.49593 | 75.03 |
| 17 | 78.151 | 0.6 | 1.67248 | 31.98 |
| 18 | 35.820 | 6.0 | 1. | |
| 19 | 21.462 | 27.2 | 1.67248 | 31.98 |
| 20 | 17.505 | | 1.49593 | 75.03 |
| | | | 1. | | where:

$S'$ = working distance at the image side, $k = 1, 2, \text{---} 20$ indicating the location in order beginning at the object side, $r_k$ = radius of curvature of the respective surfaces each of the lens elements, $d_k$ = thickness each of the lens elements and the distance between the adjacent lens elements, $n_k$ = refractive index each of the lens elements and air, and $v_k$ = Abbe number each of the lens elements.

5. Precision copying lens according to claim 1 and satisfying the following numerical data: 862.80

($f = 50$)
($S' = 4.7$)

| k | $r_k$ | $d_k$ | $n_k$ | $v_k$ |
|---|-------|-------|-------|-------|
| 1 | 862.80 | 5.5 | 1. | |
| 2 | 57.874 | 14.0 | 1.57976 | 66.41 |
| 3 | −48.839 | 5.6 | 1.52163 | 62.17 |
| 4 | −169.57 | 1.2 | 1.72934 | 55.72 |
| 5 | 96.448 | 12.3 | 1. | |
| 6 | 102.56 | 129.1 | 1.65306 | 62.85 |
| 7 | 239.36 | 6.2 | 1. | |
| 8 | 93.737 | 9.3 | 1.67248 | 31.98 |
| 9 | −182.34 | 0.6 | 1.58504 | 51.14 |
| 10 | 134.08 | 7.4 | 1. | |
| 11 | 267.36 | 23.0 | 1.68446 | 59.16 |
| 12 | 456.70 | 9.0 | 1. | |
| 13 | −58.573 | 5.5 | 1.65306 | 62.85 |
| 14 | 1940.0 | 0.3 | 1.67248 | 31.98 |
| 15 | 34.566 | 9.9 | 1. | |
| 16 | 602.30 | 4.9 | 1.49593 | 75.03 |
| 17 | 84.028 | 0.6 | 1.67248 | 31.98 |
| 18 | 32.992 | 33.2 | 1. | |
| 19 | 15.718 | | 1.52163 | 62.17 |
| | | | 1. | | where:

$S'$ = working distance at the image side $k = 1, 2, \text{---} 19$ indicating the location in order beginning at the object side, $r_k$ = radius of curvature of the respective surfaces each of the lens elements, $d_k$ = thickness each of the lens elements and the distance between the adjacent lens elements, $n_k$ = refractive index each of the lens elements and air, and $v_k$ = Abbe number each of the lens elements.

* * * * *